Patented May 19, 1925.

1,538,839

UNITED STATES PATENT OFFICE.

ARTHUR J. MOXHAM, OF ODESSA, DELAWARE, ASSIGNOR, BY MESNE ASSIGNMENTS, TO J. P. LAFFEY, TRUSTEE, OF WILMINGTON, DELAWARE.

METHOD FOR THE PRODUCTION OF ALUMINUM HYDROXIDE.

No Drawing.   Application filed December 7, 1923.   Serial No. 679,269.

*To all whom it may concern:*

Be it known that I, ARTHUR J. MOXHAM, a subject of the King of Great Britain, and a resident of Odessa, in the county of New Castle and State of Delaware, and whose post-office address is 101 Park Avenue, New York, N. Y., have invented a new and useful Method for the Production of Aluminum Hydroxide, of which the following is a specification.

My invention relates to the manufacture of alumina from minerals containing it and involves particularly a method for producing aluminum by precipitation of aluminum hydroxide from solutions containing sulfate of aluminum, including especially solutions containing sulfate of aluminum in admixture with sulfates of potassium and/or iron. I have discovered that if metallic iron is added in the proper proportion to a solution of aluminum sulfate or of these mixed sulfates, the aluminum will be precipitated in the form of the hydroxide, and if the potassium and iron sulfates are present they will remain in solution as potassium sulfate and ferrous sulfate. Another feature of my invention involves the method of treating solutions containing sulfates of aluminum, potassium and iron by first producing the aluminum hydroxide in this manner and then separating the other sulfates by crystallization.

My invention is applicable to solutions obtained by treating greensand or glauconite with sulfuric acid, but this application is not limited to solutions thus obtained. I will, however, describe the preferred process of treating such a solution as is obtained when greensand or glauconite has been treated with sulfuric acid and the silicious residue separated to produce a clear solution of sulfates of iron, potassium and aluminum.

The iron sulfate in this solution will be principally in ferric form, but there may also be some ferrous sulfate in solution. According to the nature of the leaching operation, the solution may have some free acid or may be substantially neutral.

To the clear solution, while still hot, I add enough iron scrap, preferably in the form of turnings or sheet iron scrap, or such other scrap as will dissolve quickly. Enough of this iron scrap is added to combine with all the $SO_4$ present in the sulfate of aluminum and in any free acid present and to combine with the ferric sulfate in solution to reduce it to ferrous sulfate. It is best to stir or agitate the solution during reaction. The sulfate of potassium will retain its acid and will be inert to the reaction, but the aluminum will eagerly give up its acid to the iron after the ferric sulfate has been reduced to ferrous sulfate, which will remain in solution. The aluminum sulfate has thus become aluminum hydroxide, which will precipitate.

The equation of the reaction which produces the aluminum hydroxide is:

For the sulfate of aluminum based on the crystals (hydrates)

For potash alum (crystal basis)

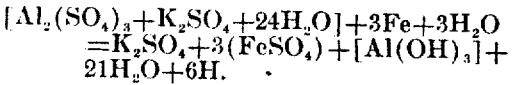

The reaction which reduces the ferric sulfate to ferrous sulfate has the following equation:

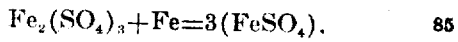

The final result is that all the aluminum present will be precipitated as aluminum hydroxide, the ferric sulfate will be reduced to ferrous sulfate, and, in conjunction with the sulfate of potassium, will remain in solution.

I find it necessary to obtain a temperature of from 90° C. to 95° C. to properly start the reaction, as it is a sluggish one at a lower temperature. This temperature may be obtained by waste steam, but the previous leaching and separation of the silicious residue may be so conducted that the solution, immediately after sep ation, is at this temperature. Once the reaction is started, the heat quickly increases, the action being an exothermic one.

The precipitated hydroxide of aluminum is filtered or otherwise separated from the accompanying solution and is washed, the washing being added to the next leach. This aluminum may be used either as the hydroxide, or by calcination it can be converted to dry alumina.

The heat evolved during the reaction can be utilized, by regulating the amount of water added to the leach, to avoid expenditure of heat in boiling off an excess of water to bring the solution down to the proper concentration (between 1.40 and 1.50 specific gravity at normal temperature) for the purpose of crystallizing out the copperas or ferrous sulfate. The mother liquor remaining can then be concentrated to give up its sulfate of potassium and its ferrous sulfate. With iron as the only reagent added to the solution of mixed sulfates, the salts have been separated; the alumina by precipitation and the copperas and sulfate of potassium by crystallization.

There are thus obtained as final products, aluminum hydroxide, sulfate of potassium and copperas.

As a modification of the process as specifically described, I first crystallize out potash alum from the solution of the mixed sulfates, leaving the ferric sulfate in solution. The potash alum may then be utilized as a final product, or as an alternative it may be dissolved in water and this aqueous solution then treated with metallic iron, as above described, to precipitate the aluminum hydroxide, the sulfate of potassium solution being then separated and the sulfate of potassium recovered by crystallization. The ferric sulfate solution may also be treated with metallic iron to reduce it to ferrous sulfate and then crystallized. In this case I can obtain as final products, potash alum, aluminum hydroxide, sulfate of potassium and copperas.

This modification of the process is somewhat more costly than the method previously described, but in the leaching of glauconite or other material containing alumina there becomes available a number of salts having very different market demands; which demands are themselves changeable. Hence, it becomes advantageous to be able to change the nature of the product during the process of manufacture to suit such changes in market as may occur.

During the operations described herein, little or no fuel is called for. The method is equally applicable to those alumina ores containing little or no iron as kaolin, feldspar derivates and the like. In these cases there will be only a small amount of copperas produced; with the glauconite a relatively small amount of alumina and a larger amount of copperas.

I claim:

1. The process of extracting alumina from minerals containing it, which involves first treating the mineral to obtain a solution of aluminum sulfate and then adding metallic iron to the solution to decompose the sulfate and precipitate aluminum hydroxide.

2. The process of extracting alumina from minerals containing it which involves first treating the mineral to obtain a solution of aluminum sulfate and then adding metallic iron to the solution while it is at a temperature of 90° C. or over to decompose the sulfate and precipitate aluminum hydroxide.

3. The process of separating and extracting alumina and potash from minerals containing both which involves first treating the mineral to obtain aluminum sulfate and potassium sulfate together in solution, then adding metallic iron to the solution to decompose the aluminum sulfate and precipitate aluminum hydroxide, then separating the aluminum hydroxide from the solution.

4. The process of separating and extracting alumina and potash from minerals containing both which involves first treating the mineral to obtain aluminum sulfate and potassium sulfate together in solution, then adding metallic iron to the solution while it is at a temperature of 90° C. or over to decompose the aluminum sulfate and precipitate aluminum hydroxide, then separating the aluminum hydroxide from the solution.

5. The process of extracting alumina from minerals containing it and ferric oxide which involves first treating the mineral to obtain a solution containing aluminum sulfate and ferric sulfate, then adding metallic iron to the solution in sufficient quantity to reduce the ferric sulfate to ferrous sulfate and to decompose the sulfate of aluminum and precipitate aluminum hydroxide, and then separating the precipitate from the solution.

6. The process of treating minerals containing ferric oxide, potash and alumina, which involves treating the mineral to obtain aluminum sulfate, ferric sulfate and potassium sulfate in solution together, then adding metallic iron to the solution in sufficient quantity to combine with the ferric sulfate to reduce it to ferrous sulfate and to decompose the sulfate of aluminum, causing such reactions to occur with precipitation of aluminum hydroxide, separating the precipitate from the solution.

7. The method of producing alumina from sulfate of aluminum in solution which consists in adding metallic iron to such solution and causing a reaction to decompose the sulfate and precipitate aluminum hydroxide.

8. The method of producing alumina from sulfate of aluminum in solution which consists in adding metallic iron to such solution and causing a reaction to decompose the sulfate and precipitate aluminum hydroxide, and finally calcining the hydroxide.

9. The method as specified in claim 7 when the solution is at a temperature of 90° C. or over, to initiate the reaction.

10. The method as specified in claim 8 when the solution is at a temperature of 90° C. or over, to initiate the reaction.

11. The method of treating solutions containing sulfate of aluminum and sulfate of potassium which consists in adding metallic iron to such solution, causing a reaction to decompose the sulfate of aluminum and precipitate aluminum hydroxide, separating the precipitate from the solution and separating the ferrous sulfate from the potassium sulfate by crystallization.

12. The method as specified in claim 11 when the solution is at a temperature of 90° C. or over to initiate the reaction.

13. The method of treating solutions containing ferric sulfate and aluminum sulfate which consists in adding metallic iron to the solution in a sufficient quantity to reduce the ferric sulfate to ferrous sulfate and to decompose the sulfate of aluminum, causing such reaction to effect such reduction and decomposition with precipitation of aluminum hydroxide, and then separating the precipitate from the ferrous sulfate solution.

14. The process as specified in claim 13 when the solution is at a temperature of 90° C. or over to initiate the reaction.

15. The process of treating solutions containing sulfate of aluminum, sulfate of potassium, and ferric sulfate which consists in adding metallic iron to the solution in sufficient quantity to reduce the ferric sulfate to ferrous sulfate and to decompose the sulfate of aluminum, causing such reaction to occur with precipitation of aluminum hydroxide, separating the precipitate from the solution, and separating the ferrous sulfate from the potassium sulfate by crystallization.

16. The process as specified in claim 15 when the solution is at a temperature of 90° C. or over to initiate the reaction.

In testimony whereof, I have signed my name to this specification.

ARTHUR J. MOXHAM.

10. The method as specified in claim 8 when the solution is at a temperature of 90° C. or over, to initiate the reaction.

11. The method of treating solutions containing sulfate of aluminum and sulfate of potassium which consists in adding metallic iron to such solution, causing a reaction to decompose the sulfate of aluminum and precipitate aluminum hydroxide, separating the precipitate from the solution and separating the ferrous sulfate from the potassium sulfate by crystallization.

12. The method as specified in claim 11 when the solution is at a temperature of 90° C. or over to initiate the reaction.

13. The method of treating solutions containing ferric sulfate and aluminum sulfate which consists in adding metallic iron to the solution in a sufficient quantity to reduce the ferric sulfate to ferrous sulfate and to decompose the sulfate of aluminum, causing such reaction to effect such reduction and decomposition with precipitation of aluminum hydroxide, and then separating the precipitate from the ferrous sulfate solution.

14. The process as specified in claim 13 when the solution is at a temperature of 90° C. or over to initiate the reaction.

15. The process of treating solutions containing sulfate of aluminum, sulfate of potassium, and ferric sulfate which consists in adding metallic iron to the solution in sufficient quantity to reduce the ferric sulfate to ferrous sulfate and to decompose the sulfate of aluminum, causing such reaction to occur with precipitation of aluminum hydroxide, separating the precipitate from the solution, and separating the ferrous sulfate from the potassium sulfate by crystallization.

16. The process as specified in claim 15 when the solution is at a temperature of 90° C. or over to initiate the reaction.

In testimony whereof, I have signed my name to this specification.

ARTHUR J. MOXHAM.

Certificate of Correction.

It is hereby certified that in Letters Patent No. 1,538,839, granted May 19, 1925, upon the application of Arthur J. Moxham, of Odessa, Delaware, for an improvement in "Methods for the Production of Aluminum Hydroxide," errors appear in the printed specification requiring correction as follows: Page 1, line 72, in the formula, before "3Fe" insert a plus sign (+); same page, line 78, before "[Al(OH)$_3$]" insert the numeral 2; and that the said Letters Patent should be read with these corrections therein that the same may conform to the record of the case in the Patent Office.

Signed and sealed this 1st day of September, A. D. 1925.

[SEAL.]

KARL FENNING,
*Acting Commissioner of Patents.*

Certificate of Correction.

It is hereby certified that in Letters Patent No. 1,538,839, granted May 19, 1925, upon the application of Arthur J. Moxham, of Odessa, Delaware, for an improvement in "Methods for the Production of Aluminum Hydroxide," errors appear in the printed specification requiring correction as follows: Page 1, line 72, in the formula, before "3Fe" insert a plus sign (+); same page, line 78, before "[Al(OH)$_3$]" insert the numeral 2; and that the said Letters Patent should be read with these corrections therein that the same may conform to the record of the case in the Patent Office.

Signed and sealed this 1st day of September, A. D. 1925.

[SEAL.]
KARL FENNING,
*Acting Commissioner of Patents.*